United States Patent

[11] 3,539,148

[72] Inventor Philip D. Boos, Jr.
Speedway, Indiana
[21] Appl. No. 754,388
[22] Filed Aug. 21, 1968
[45] Patented Nov. 10, 1970
[73] Assignee Stewart-Warner Corporation
Chicago, Illinois
a corporation of Virginia

[54] CENTER PIVOTED BUTTERFLY DUMP VALVE
10 Claims, 6 Drawing Figs.
[52] U.S. Cl. .................................................. 251/138,
251/306, 251/308
[51] Int. Cl. .................................................. F16k 31/04
[50] Field of Search ........................................ 251/133,
305, 306, 308, 138

[56] References Cited
UNITED STATES PATENTS
2,385,510 9/1945 Harwood ...................... 251/306
3,319,646 5/1967 Smulka ......................... 251/133X
FOREIGN PATENTS
139,344 11/1934 Austria ......................... 251/308
764,946 1/1957 Great Britain ................ 251/305
955,502 4/1964 Great Britain ................ 251/305

Primary Examiner—Arnold Rosenthal
Attorney—Augustus G. Douvas, William J. Newman and Norton Lesser ABSTRACT: A butterfly valve employing a peripherally grooved disc carrying an O-ring seal, and upper and lower split mounting pins for center pivoting the valve disc within the valve body without detriment to the peripheral seal.

Patented Nov. 10, 1970
3,539,148
Sheet 1 of 2
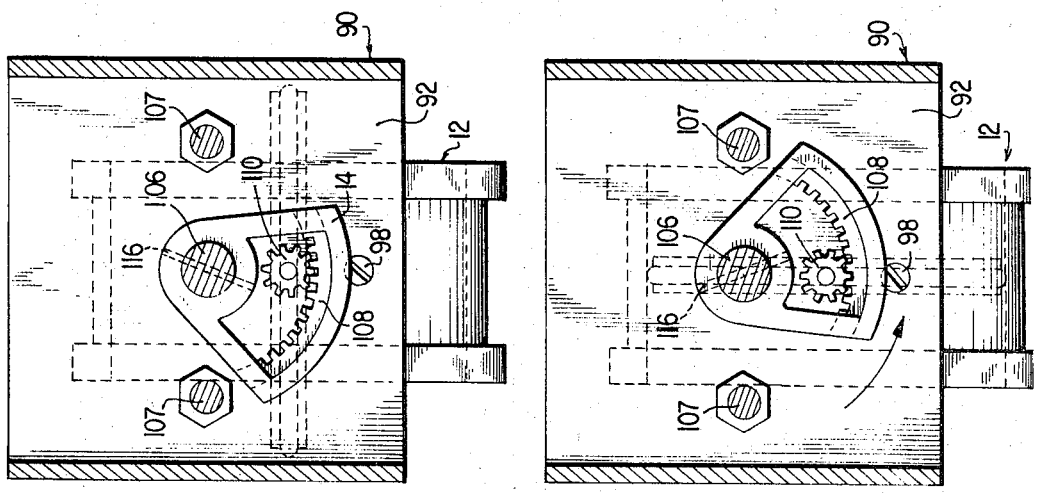
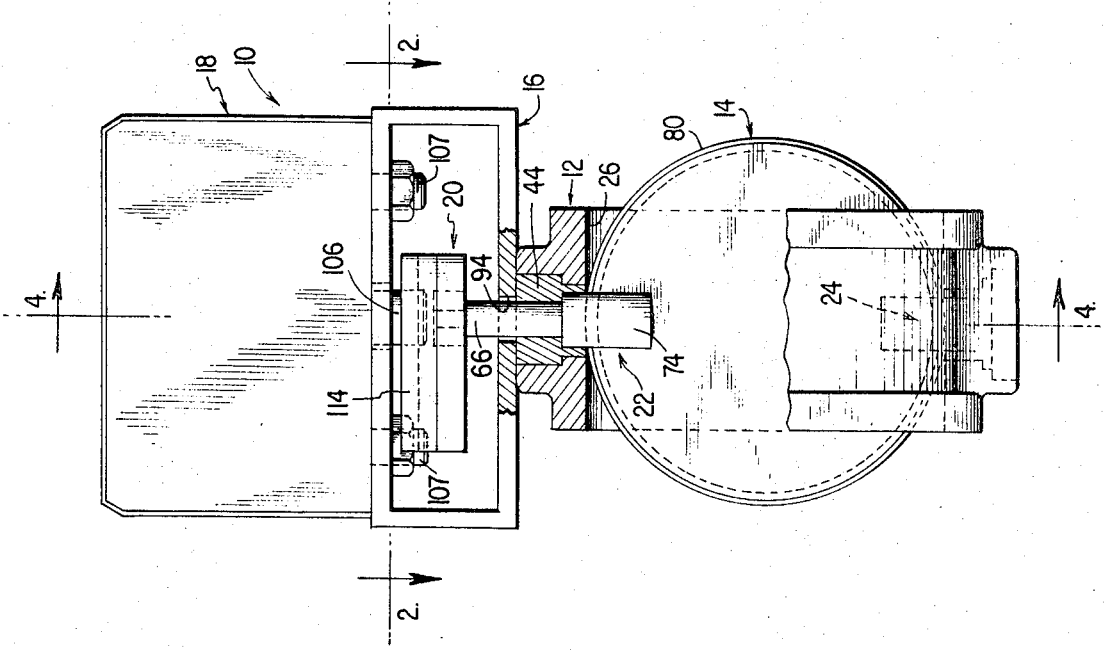
INVENTOR
PHILLIP D. BOOS, JR.
BY *A. G. Douvas*
ATTORNEYS Patented Nov. 10, 1970

INVENTOR
PHILLIP D. BOOS, JR.

BY

ATTORNEYS

CENTER PIVOTED BUTTERFLY DUMP VALVE

BACKGROUND OF THE INVENTION

1. Field of the Invention

This invention relates to butterfly valves, and more particularly to a center-pivoted, solenoid-operated butterfly-type valve for use in light aircraft as dump valves to rapidly equalize exterior and interior pressures in the event of a too rapid altitude change to avoid implosions. It may be used however, as a shutoff diverter, or flow path selection device for general hydraulic and pneumatic service.

2. Description of the Prior Art

Prior art butterfly valves, in general, employ a closure plate carried by a cylindrical valve body and mounted for pivoting on one side of a single stem such that the axis of the single pivot stem is offset from the center line of the closure plate or disc. Since the valve plate or disc does not contain the axis of rotation, it is oval rather than round, as a completely round disc would be prevented from closing completely. However, an elliptically-shaped closure plate is difficult to fabricate so as to insure adequate sealing when in the closed position.

There have been attempts to employ a round closure plate; however, due to the necessity for a seal to be maintained about the complete periphery of the plate or disc, the axis of rotation is generally offset from the plane of the closure plate or skewed so that a full peripheral seal can be employed.

SUMMARY OF THE INVENTION

This invention is directed to a butterfly valve construction in which the valve body is provided with a cylindrical flow passage and a circular valve disc is positioned therein having a diameter slightly less than the internal diameter of the flow passage. Sealing means are carried on the full periphery of the valve disc for complete circular contact with the flow passage wall when the valve disc is in closed position. The valve disc is mounted within the valve body for pivoting about an axis passing through the center of the valve disc and at right angles to the axis of the flow passage.

Preferably, the valve disc mounting means comprises a pair of pins which are carried by opposed bores within the valve body at right angles to the flow passage axis, the inner ends of the pins are slotted to receive the valve disc with the peripheral sealing means also passing through the pin slot. The valve disc carries a peripheral groove which receives an O-ring as the sealing means. Preferably, the split pins are formed of polytetrafluorethylene, manufactured by E. I. duPont Co. under the trade name Teflon and are received within Teflon bushings carried by the opposed valve body bores. A solenoid actuator is carried by bracket means coupled to the valve body. The solenoid actuator shaft is fixed to a sector gear meshing with a pinion fixed to the end of the Teflon pin which extends outwardly from the valve body and within the mounting bracket.

The resilient O-ring may be split in the vicinity of the lower pivot pin to receive a silicone rubber spacer to facilitate ring expansion and contraction during rotation and/or temperature change without loss of seal.

BRIEF DESCRIPTION OF THE DRAWINGS

FIG. 1 is a side elevational view, partially in section, of the solenoid operated, center-pivot butterfly-type valve of the present invention.

FIG. 2 is a sectional, plan view of a portion of the valve shown in FIG. 1 taken along line 2–2, showing the valve disc in the fully open position;

FIG. 3 is the same sectional, plan view of the valve as FIG. 2 with the valve disc in fully closed position;

DESCRIPTION OF THE PREFERRED EMBODIMENT

Figure 5:
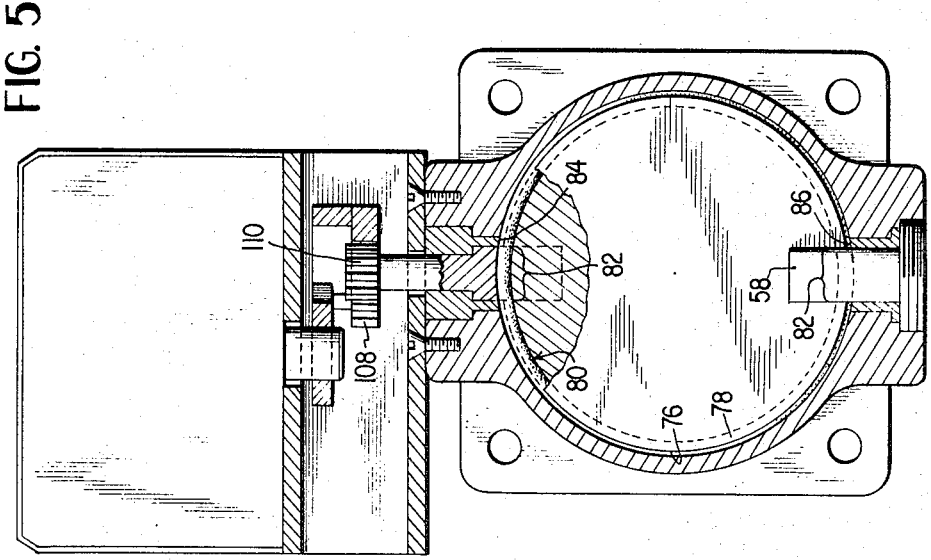
FIG. 5 is the same elevational view as FIG. 4, but with the valve disc in fully closed position.

Referring to the drawings, the solenoid operated, center-pivot butterfly-type valve 10 of the present invention comprises essentially a valve body 12 carrying a center-pivoted valve disc 14 with a bracket 16 fixed to the valve body and supporting a conventional valve actuator solenoid 18 on its upper surface. An internal gear assembly 20 couples the solenoid 18 to the butterfly valve disc 14 through an upper pivot pin 22. A similarly formed lower pivot pin 24 acts, in conjunction with pin 22, to support the valve disc 14 for pivotable rotation about a common pin axis which also passes through the center of the valve disc 14.

The unitary valve body 12 may be of cast metal construction and includes the cylindrical flow passage formed by internal bore 26. Mounting flanges 28 (FIG. 4) are formed on each side of the valve body and carry holes 30 to allow the valve to be supported in the position shown and coupled to appropriate fluid conducting conduits (not shown) on either side thereof.

The valve and solenoid assembly is particularly designed for use in the light aircraft industry wherein exterior and interior pressure differentials may be rapidly equalized in the event of too rapid a change in aircraft altitude in order to prevent implosions such as during descent.

The valve body 12 is provided with vertical, aligned bores, bore 32 at the top of the valve and bore 34 at the bottom of the valve body. The valve body is counterbored exteriorly of bore 32 as at 36, and is provided with a pair of counterbores 38 and 40, below bore 34 at the bottom of the valve body. Further, counterbore 40 is threaded to receive a Teflon threaded plug 42 during assembly. Upper bushing 44, specially formed of Teflon or the like, is received within counterbore 36 and has a reduced diameter section 46 which is received in bore 32. At the bottom of the valve body, a second, or lower bushing 48 is principally carried by bore 34. Bushing 48 includes a flange portion 50 which is carried by the first counterbore 38. The bushings 44 and 48 remain fixed in position within the valve body and form the bearing surfaces for the Teflon pivot pins 22 and 24 respectively.

The lower Teflon pivot pin 24 has a diameter on the order of the internal diameter of bushing 48 and the outer end 52 is received within the bushing. The inner end 58 of the Teflon pin is slotted at 54. The valve disc 14 is provided with a pair of opposed slots 56 to receive the slotted inner end 58 of the lower pivot pin. The inner ends of the slotted Teflon pin contact shoulders 60 of the valve disc formed by the paired disc slots 56. At the upper end of the valve body 12, upper Teflon pivot pin 22 is received within upper Teflon bushing 44. The bushing 44 is bored centrally at 62 and is counterbored at 64 at its inner end. In similar fashion, the Teflon pivot pin 22 is provided with a reduced diameter outer section 66 and a larger diameter inner end 68, which is partially carried by counterbore 64. In like fashion to the lower pin and bushing connection, the upper bushing 44 remains fixed while the upper pivot pin 22 rotates about a common pin and bushing axis which is also in line with the center line of the valve disc 14. Further, the enlarged diameter inner end 68 of the Teflon pivot pin is slotted centrally at 70 and upper end of the valve disc is provided with a pair of opposed slots 72 which receive the slotted ends 74 of the upper pivot pin 22.

Figure 4:
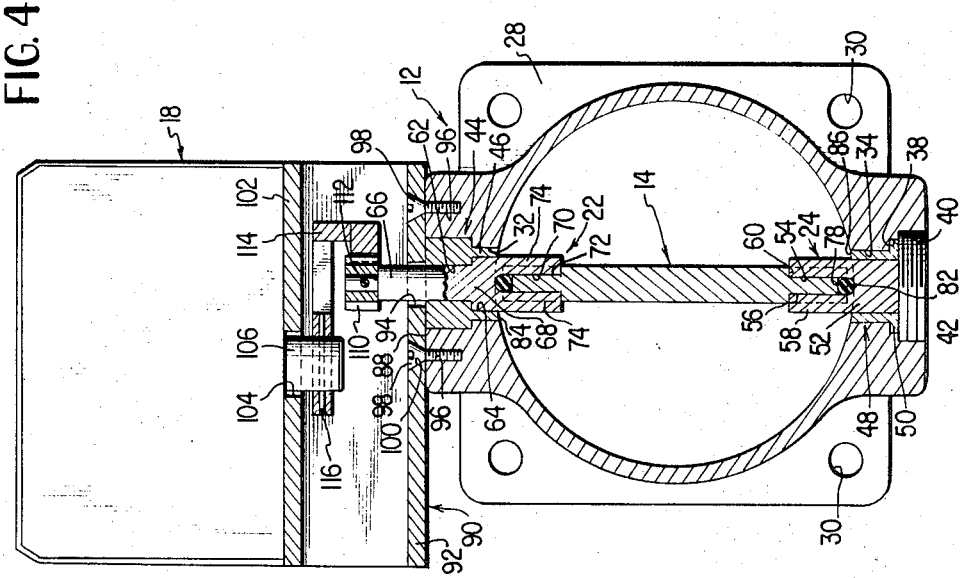
FIG. 4 is an elevational sectional view of the valve taken about lines 4–4 of FIG. 1.

A principal feature of the present invention resides, also, in the fact that the peripheral edge 76 of the valve disc 14 carries a circumferential recess or groove 78 extending completely about its periphery, with an O-ring 80 formed of silicone rubber or like elastomeric material received within the slot. The thickness of the O-ring 80 is such that with the O-ring in place, the diameter of the valve disc assembly is slightly in excess to the diameter of the bore 26 of the valve body. Thus, with the valve disc in closed position, there is completed a full seal between the valve disc assembly and the valve flow passage or bore 26 since the pressure on the upstream side of the O-ring will produce a "corner effect" on the rubber ring. The center-pivot is achieved without disrupting the complete peripheral seal by having portions 82 of the O-ring seal passing through the upper and lower pivot pins 22 and 24 respectively. Specifically, the O-ring portions 82 are in that area sandwiched between portions of the valve disc 14 and the bottom and side of the respective pivot pin slots. It is noted that the inner ends of the bushings or stationary components both terminate in a cylindrical radius indicated at 84 for the upper bushing 44, and 86 for the lower bushing 48. With the cylindrical radius of the stationary bushing matching the radius of the valve body, there will be reduced tendency of any tearing action on the O-ring seal. The slotted upper and lower Teflon pivot pins acting as yokes, allow pivoting of the valve disc to occur through the axis of the pivot pin without interfering with the full circumferential seal during valve closed position. The O-ring is carried within the pin slots between the pins and the valve disc 14, so there is no necessity for accurately conforming the paired side slots on the valve disc to the pin side extensions created by the pin slots. Thus, since the O-ring is resilient, the valve disc may move up or down slightly along the pivot axis relative to the captured pivot pins to take care of any small misalignment and "off $\pi°$" stoppage leakage in this manner is reduced. Further, by using the split pivot pins or yokes and the Teflon bushings, both formed of Teflon material, the principal leakage around the pivot pins is also minimized. An added feature resides in the reduced and streamlined profile of the butterfly valve disc in open position as indicated in FIG. 4, which reduces pressure drop across the valve with the valve in the fully open position. By employing two separate stem or pivot pin members, the closure plate or valve disc 14 readily centers itself during closing movement and thus compensates for any out-of-roundness of the cylindrical member and scratches on the same as well as other tolerance problems which may exist due to the environmental temperature.

The valve is actuated in the positive manner as a result of energization of solenoid 18. In this respect, the top of the valve body 12 is provided with a flat surface 88 which carries mounting bracket 90 in the form of an open frame member. The bottom plate element 92 of the bracket is apertured at 94 to allow the outer end 66 of the upper pivot pin to project therethrough. Further, the top of the valve body includes threaded holes 96 for receiving bracket mounting screws 98 which extend through mounting holes 100 carried by the bracket plate 92. The bracket also carries an upper plate 102 which is apertured at 104 to receive the depending solenoid actuator shaft 106. The valve actuator solenoid 18 is fixedly coupled to the upper bracket plate 102 by a pair of mounting bolt and nut assemblies 107, FIG. 1. The internal gear assembly 20 couples the solenoid actuator shaft 106 to the upper end 66 of the upper pivot pin 22. In this respect, the assembly 20 includes a sector gear 108 which is in mesh with small pinion gear 110 fixed to the end of pivot pin 66 by a transverse roll pin 112. The sector gear 108 is carried by a mounting arm 114 whose pivot axis coincides with the axis of actuator 106, the arm being fixed to the actuator shaft 106 by a second transverse roll pin 116.

In operation, the valve may include spring biasing means (not shown) to maintain the disc valve 14 in either the fully open or fully closed position in the absence of energization of solenoid 18. In the embodiment shown, in the absence of energization, the valve disc 14 is shown as being in the fully open position as best seen in FIG. 2. Oscillation of the sector gear 108 occurs in a counterclockwise direction in response to solenoid energization to pivot the valve disc 14 from fully open to fully closed position. The fully closed position is shown in FIG. 3, the rotation being in the direction of the arrow. During rotation from fully open to fully closed position as indicated previously, the closure plate or disc, which is captured between the slotted ends of the upper and lower pivot pins, centers itself along the pivot axis with some minor deformation to the peripheral O-ring to thus compensate for any out-of-roundness of the cylindrical chamber or scratches on the same, or as a result of any tolerance problems set up during assembly.

Figure 6:
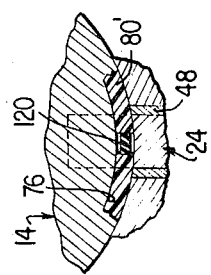
FIG. 6 is a partial elevational view in section of a modified embodiment of the present invention incorporating a split O-ring seal.

Turning to FIG. 6, a modification of the center-pivoted circular disc butterfly-type type valve involves a split resilient sealing ring rather than the unitary O-ring of the previous embodiment. The valve assembly with the exception of the sealing element is identical to the previous embodiment in that the valve disc 14 is provided with a circumferential groove 76 to receive a modified resilient ring 80' which again passes through the split pivot pin 24 which is carried by bushing 48 within valve body 12. The sealing element 80' in this case is a split ring of Teflon or like material which is separated by a section 120 of silicone rubber or other suitable elastomeric material, the section 120 being of smaller diameter than that of the nonresilient Teflon ring 80' which occupies the major peripheral portion of the peripheral groove 76 of the valve disc when the Teflon ring is relaxed in valve open position. This split or separation allows the Teflon ring to flex with temperature and float outwardly by duct pressure when the valve is in the closed position. Further, the employment of a Teflon split ring provides a compatible ring material to the Teflon bushing 48 and the Teflon pin 24 to reduce the possibility of loss of seal during environmental temperature changes. This combination thus provides maximum sealing and minimum break away torque requirements for the valve. The noncold flowing properties of Teflon allow the split ring to float more readily with low break away torque than a solid rubber O-ring.

The valve is easily assembled by positioning the valve disc 14 within the valve body bore 26 and then inserting the upper pivot pin through bore 36 and counterbore 46 prior to placement of the Teflon bushing 44 within the opening and after pivot pin 22 has its slotted end fitted onto the oppositely paired slots 72 of valve disc 14. In similar fashion, with lower Teflon bushing 48 in place, the lower pivot pin is slid through bushing 48, the slotted ends entering the opposed slots 56 at the lower end of the valve disc 14. The bracket 90 is positioned on the flattened surface 88 of the valve body and screws 98 fixedly couple the bracket to the valve body. The bracket maintains both the upper bushing 44 and the pivot pin 22 in place prior to threading plug 42 into threaded bore 40 of the valve body to maintain the valve components in position.

Finally, the internal gear assembly including arm 114 and pinion gear 110 are fixedly coupled to the protruding ends 106 of the solenoid actuator shaft 106 and the end 66 of the upper Teflon pivot pin by roll pins 116 and 112 respectively. Other than the solenoid, the Teflon bushing, pivot pin members, and the O-ring seal, the elements of the butterfly valve assembly may be formed of metal or other material compatible with the environment, in which the valve is used and the fluid passing therethrough. The valve may be made pressure closing and a small additional spring force (not shown) may be employed to aid in overcoming the "O-ring" friction force. An external positive stop may be employed to eliminate dependence upon the solenoid for positioning the butterfly valve. Of course, the improved butterfly valve has application other than in the light aircraft industry, and it is not intended that the illustrated embodiments be limited to such applications.

While the invention has been particularly shown and described with reference to a preferred embodiment, it will be understood by those skilled in the art that the foregoing and other changes in form and details may be made therein without departing from the spirit and scope of the invention.

I claim:

1. An improved butterfly-type valve comprising: a valve body having a cylindrical flow passage forming a valve seat, a circular valve disc of a diameter slightly less than said flow passage, sealing means carried on the full periphery of said valve disc for complete circumferential contact with the flow passage wall when the disc is in valve closed position, and means carried by said valve body for pivotally mounting said disc about an axis passing through the center of said disc and at right angles to the axis of said flow passage, said mounting means comprising upper and lower pivot pins, opposed bores formed in said valve body at right angles to the flow axis to receive portions of said pins, the inner ends of said pins being split to sandwich said disc and said peripherally carried sealing means.

2. The butterfly-type valve as claimed in claim 1 wherein said circular butterfly valve disc is provided with a peripheral groove, and said sealing means comprises an O-ring carried thereby.

3. The butterfly-type valve as claimed in claim 1 further including: opposed slots on the sides of said valve disc along edges adjacent said pins for receiving the split ends of said pivot pins.

4. The butterfly-type valve as claimed in claim 3 wherein said circular butterfly valve disc is circumferentially grooved about its periphery, and said sealing means comprises an O-ring carried thereby and sandwiched by the inner end of said pivot pin slots.

5. The butterfly-type valve as claimed in claim 4 wherein said O-ring is formed of Teflon and is separated by a short section of elastomeric material.

6. The butterfly-type valve as claimed in claim 4 wherein said pins are formed of Teflon.

7. The butterfly-type valve as claimed in claim 5 wherein said butterfly valve further includes Teflon bushings carried by opposed valve body bores between said Teflon pins and said valve body.

8. A solenoid actuated butterfly-type valve comprising a valve body having a cylindrical flow passage forming a valve seat, a circular butterfly valve disc of a diameter slightly less than said flow passage, sealing means carried on the periphery of said disc for full circumferential contact with the flow passage with the disc-in-valve closed position, opposed bores carried by said valve body and a pair of mounting pins carried within said bores and coupled to said valve disc for pivotally supporting said valve disc about a pivot axis passing through the center of the valve disc and at right angles to the axis of the flow passage, said pivot pins having their inner ends split to sandwich both said valve disc and said sealing means, solenoid means fixedly carried by said valve body, and gear means operatively coupled to said solenoid and to one of said pivot pins.

9. The solenoid actuated butterfly valve as claimed in claim 8 wherein said pivot pins are formed of Teflon, and wherein said sealing means includes a full peripheral groove around said disc, and an O-ring positioned within said groove.

10. The valve as claimed in claim 9 wherein said O-ring is formed of Teflon and is separated by a short section of silicone rubber.